(12) United States Patent
Liu et al.

(10) Patent No.: US 10,487,728 B1
(45) Date of Patent: Nov. 26, 2019

(54) COMBUSTION CHAMBER FOR ROTARY ENGINE

(71) Applicants: Nien-Tzu Liu, Taipei (TW); Cheng-Shen Chu, Taipei (TW); Ta-Tung Cheng, Taipei (TW)

(72) Inventors: Nien-Tzu Liu, Taipei (TW); Cheng-Shen Chu, Taipei (TW); Ta-Tung Cheng, Taipei (TW)

( * ) Notice: Subject to any disclaimer, the term of this patent is extended or adjusted under 35 U.S.C. 154(b) by 38 days.

(21) Appl. No.: 16/005,041

(22) Filed: Jun. 11, 2018

(51) Int. Cl.
*F02B 55/14* (2006.01)
*F02B 53/12* (2006.01)
*F02B 55/08* (2006.01)

(52) U.S. Cl.
CPC .............. *F02B 55/14* (2013.01); *F02B 53/12* (2013.01); *F02B 55/08* (2013.01)

(58) Field of Classification Search
CPC .......... F02B 55/14; F02B 53/12; F02B 55/08; Y02T 10/12
USPC ...................................................... 123/210
See application file for complete search history.

(56) References Cited

U.S. PATENT DOCUMENTS

| | | | | |
|---|---|---|---|---|
| 2,060,937 A | * | 11/1936 | Hinckley | F01C 11/004 123/225 |
| 3,750,630 A | * | 8/1973 | Hariman | F01B 3/0079 60/39.44 |
| 4,357,794 A | * | 11/1982 | Nelson | F02C 5/04 60/39.34 |
| 4,715,338 A | * | 12/1987 | Pasquan | F01C 1/46 123/248 |
| 5,072,705 A | * | 12/1991 | Overman | F01C 1/3442 123/231 |
| 6,082,324 A | | 7/2000 | Liu | |
| 2007/0107679 A1 | * | 5/2007 | Schmied | F01B 9/026 123/55.5 |

FOREIGN PATENT DOCUMENTS

| | | | | |
|---|---|---|---|---|
| FR | 2440473 A1 | * | 5/1980 | ............ F01C 1/3562 |
| GB | 1531541 A | * | 11/1978 | ............. F01C 21/08 |
| TW | I468581 | | 1/2015 | |
| TW | I479075 | | 4/2015 | |

* cited by examiner

*Primary Examiner* — Patrick D Maines
(74) *Attorney, Agent, or Firm* — WPAT, PC

(57) ABSTRACT

A combustion chamber for rotary engine includes an inner chamber having a spherical interior wall surface and including a left-half and a right-half chamber tightly connected together; and an outer casing including an upper cover, a lower cover and a locating plate. The left-half chamber has an intake pipe arranged on a left end thereof and a spark-plug mounting pipe perpendicularly extended from a right end thereof; and the right-half chamber has an exhaust pipe arranged on a right end thereof. The upper and lower covers are fitted onto upper and lower sides of the inner chamber, respectively; and the locating plate is provided with a central opening for the spark-plug mounting pipe to extend therethrough. The upper and lower covers and the locating plate are screw-fastened together to form the complete outer casing, such that the inner chamber is confined in the outer casing to maintain an integral state.

4 Claims, 6 Drawing Sheets

COMBUSTION CHAMBER FOR ROTARY ENGINE

FIELD OF THE INVENTION

The present invention relates to a combustion chamber for a rotary engine. The combustion chamber includes an inner chamber having a spherical interior wall surface to enable an optimal combustion effect.

BACKGROUND OF THE INVENTION

U.S. Pat. No. 6,082,324 granted to the same inventor discloses a rotary internal combustion engine, which is a rotary engine including two rotors respectively having a plurality of eccentric blades. More specifically, the rotary internal combustion engine includes a compression cylinder, a combustion chamber and a power cylinder. The compression cylinder and the power cylinder are internally provided with a compression rotor and a power rotor, respectively, which are fixedly mounted on the same one rotary shaft. The compression rotor and the power rotor respectively have three eccentric blades. When the rotary shaft rotates, the compression rotor compresses air in the compression cylinder and pushes the compressed air into the combustion chamber, in which the compressed air is ignited and exploded to produce expanded high-temperature and high-pressure gas. The expanded gas is sent into the power cylinder to move the eccentric blades in the power cylinder and accordingly drives the rotary shaft to rotate. For the rotary engine to operate in a smoother manner, the same inventor has further developed some related techniques, which have been granted Taiwan Patent Nos. I 468581 and I 479075.

For a general single-cylinder engine, a piston is moved after the ignition and the explosion stroke to output power. However, in the above-mentioned rotary engine, the compressed air is ignited and combusted in the combustion chamber to produce the high-temperature and high-pressure gas, which is sent into the power cylinder to drive the power rotor to rotate and accordingly output power. Therefore, the conventional single-cylinder engine does not include an independent combustion chamber.

In consideration of the integrity of the multi-cylinder engine structure, it is necessary to develop a combustion chamber that has simplified structure and is easy to install.

SUMMARY OF THE INVENTION

A primary object of the present invention is to develop a structurally simplified and easily mountable combustion chamber for the rotary engine.

Another object of the present invention is to provide a combustion chamber that includes an inner chamber having a spherical interior wall surface to enable an optimal combustion effect.

To achieve the above and other objects, the combustion chamber for rotary engine according to the present invention includes an inner chamber and an outer casing. The inner chamber includes a left-half chamber and a right-half chamber, which are combined and tightly connected together to provide the complete inner chamber. The inner chamber has a spherical interior wall surface. The outer casing confines the inner chamber therein, so that the inner chamber is maintained in an integral state.

The left-half chamber has an intake pipe arranged on a left end thereof and a spark-plug mounting pipe perpendicularly extended from a right end thereof; and the right-half chamber has an exhaust pipe arranged on a right end thereof.

The outer casing includes an upper cover, a lower cover and a locating plate. The upper cover is fitted onto an upper side of the inner chamber, and the lower cover is fitted onto a lower side of the inner chamber. The locating plate is provided at a central area with an opening for the spark-plug mounting pipe to extend therethrough. One end of the upper and the lower cover are screw-fastened together, and the locating plate is locked to another end of the upper and the lower cover with screws to thereby complete the complete outer casing.

The left-half chamber has an outer-diameter-expanded first flange formed on around the right end of the left-half chamber and the right-half chamber has an outer-diameter-expanded second flange formed on around a left end of the right-half chamber; and the upper cover has an axially extended first recess centered at an inner wall surface thereof and the lower cover has an axially extended second recess centered at an inner wall surface thereof. An upper part of the first flange of the left-half chamber and an upper part of the second flange of the right-half chamber are fitly received and juxtaposed in the first recess; and a lower part of the first flange of the left-half chamber and a lower part of the second flange of the right-half chamber are fitly received and juxtaposed in the second recess.

The locating plate is provided with four pin holes for four screws to extend therethrough and then thread into internally threaded holes that are pre-formed on the upper and the lower cover corresponding to the pin holes on the locating plate.

The lower cover of the outer casing is provided on a bottom outer surface with a plurality of radiating fins.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1:
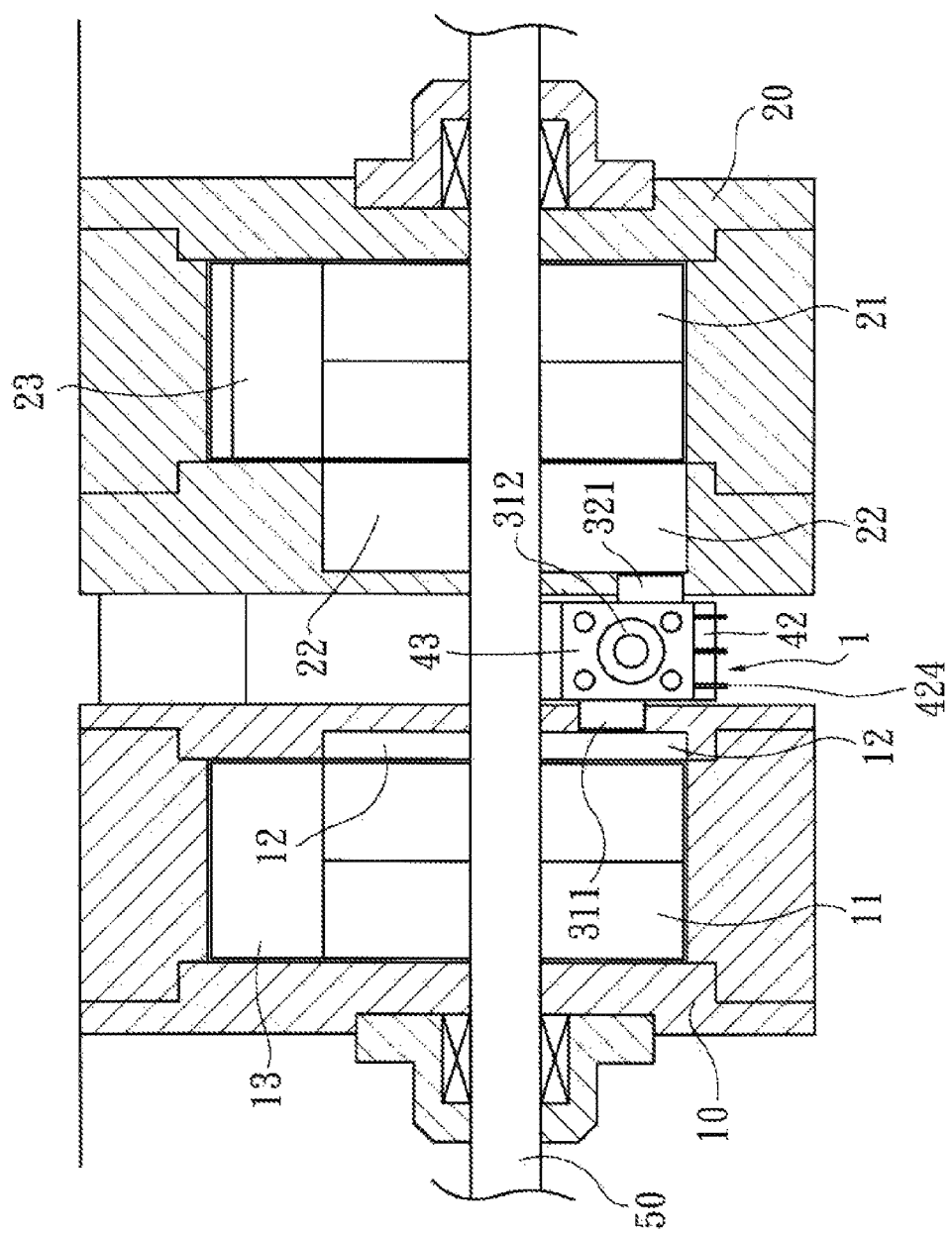
FIG. 1 is an assembled sectional view showing the combustion chamber of the present invention is mounted on a rotary engine.
Figure 2:
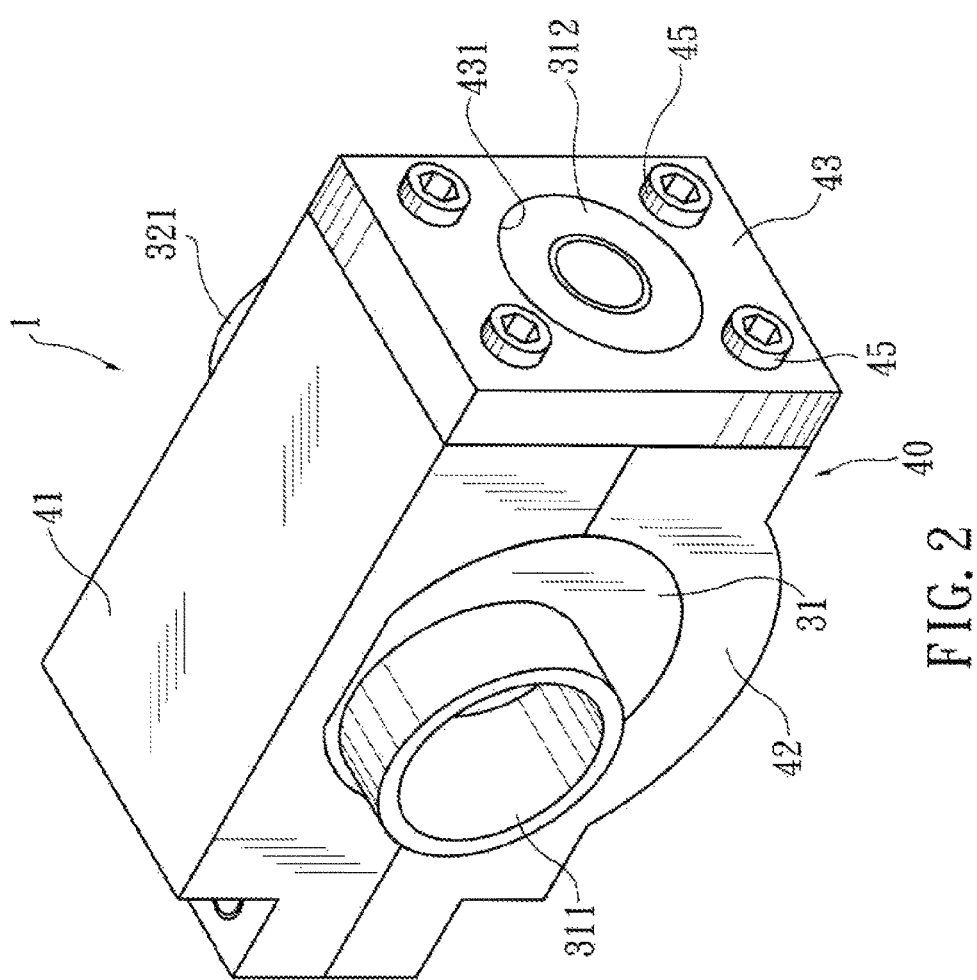
FIG. 2 is an assembled perspective view of the combustion chamber for rotary engine according to a preferred embodiment of the present invention.
Figure 3:
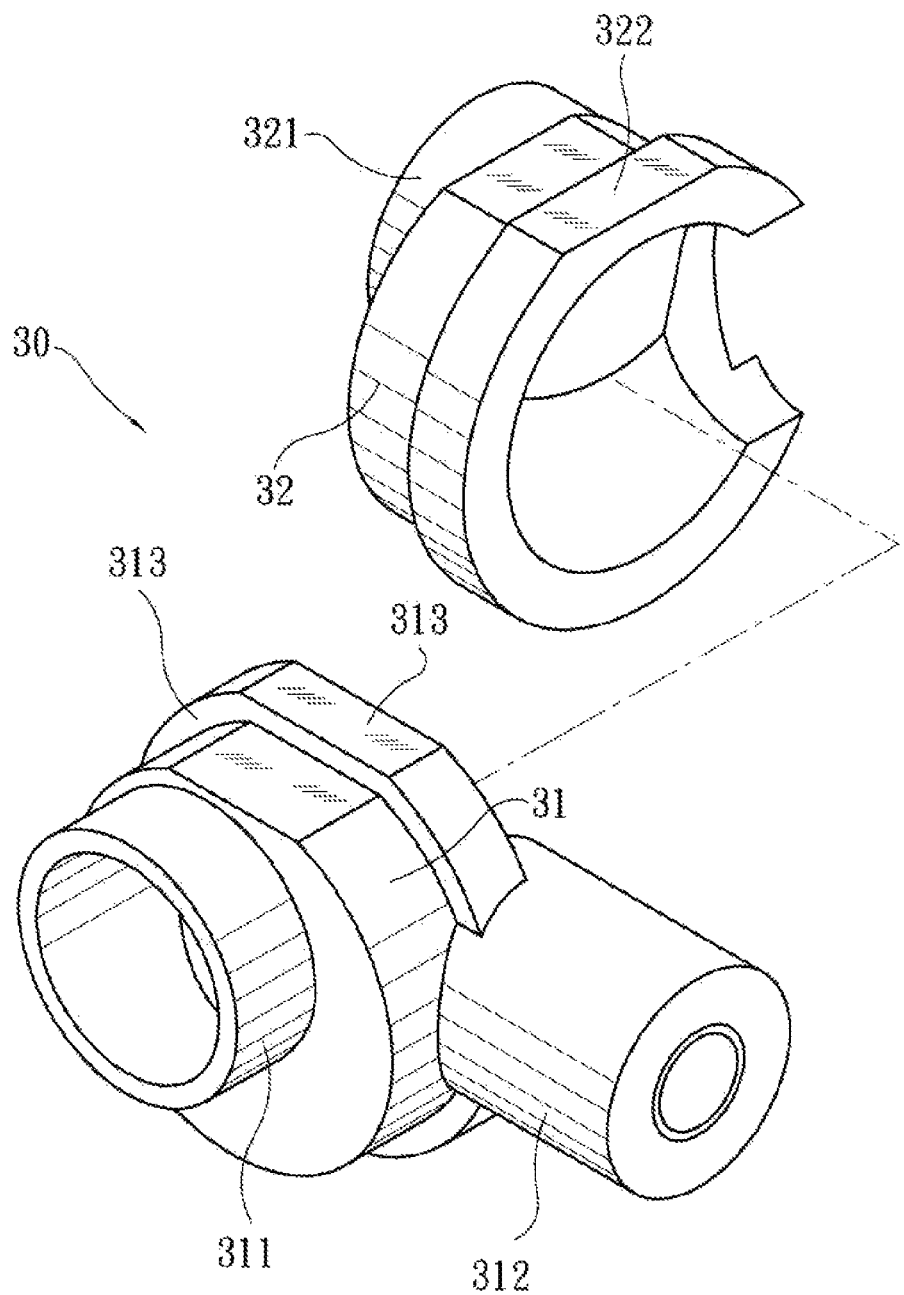
FIG. 3 is an exploded perspective view of an inner chamber for the combustion chamber of the present invention.
Figure 4:
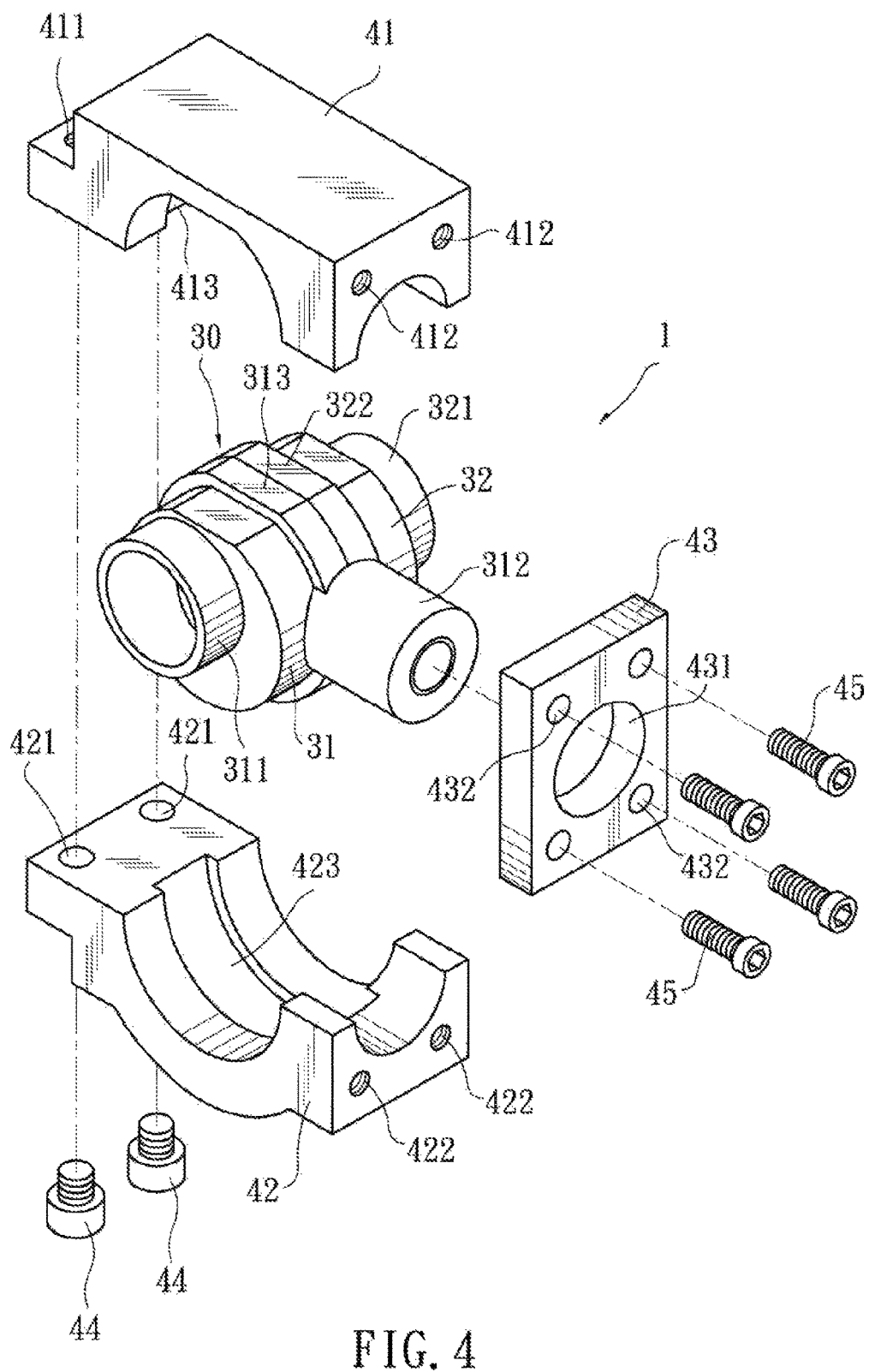
FIG. 4 is an exploded perspective view of the combustion chamber shown in FIG. 2.

Please refer to FIGS. 1 to 4, in which a combustion chamber for rotary engine according to a preferred embodiment of the present invention is shown. For the purpose of conciseness, the present invention is also briefly referred to as the combustion chamber herein and generally denoted by reference numeral 1. As shown, the combustion chamber 1 is mounted in a rotary engine having a compression cylinder 10 and a power cylinder 20. The combustion chamber 1 includes an inner chamber 30 and an outer casing 40. The inner chamber 30 is provided with an intake pipe 311 communicably connected to the compression cylinder 10 and an exhaust pipe 321 communicably connected to the power cylinder 20. The compression cylinder 10 has a first rotary valve 12 that allows or stops the communication between the intake pipe 311 and the compression cylinder 10, and the power cylinder 20 has a second rotary valve 22 that allows or stops the communication between the exhaust pipe 321 and the power cylinder 20.

The compression cylinder 10 is internally provided with a compression rotor 11, and the power cylinder 20 is internally provided with a power rotor 21. The compression rotor 11 and the power rotor 21 are fixedly mounted on the same one rotary shaft 50. The compression rotor 11 has three blades 13 and the power rotor 21 has three blades 23. When the rotary shaft 50 rotates, the compression rotor 11 compresses air in the compression cylinder 10 and pushes the compressed air into the combustion chamber 1 via the intake pipe 311. In combustion chamber 1, the compressed air is ignited and exploded to produce expanded high-temperature and high-pressure gas, which is then fed through the exhaust pipe 321 into the power cylinder 20 to drive the blades 23 to move, so as to rotate the power rotor 21 and accordingly, the rotary shaft 50.

The inner chamber 30 is formed of a left-half chamber 31 and a right-half chamber 32, which can be combined and tightly connected together to provide the complete inner chamber 30, which has a spherical interior wall surface. The intake pipe 311 is arranged on a left end of the left-half chamber 31, and a spark-plug mounting pipe 312 is perpendicularly extended from a right end of the left-half chamber 31. The exhaust pipe 321 is arranged on a right end of the right-half chamber 32. The spark-plug mounting pipe 312 is mainly used to receive a spark plug (not shown) therein.

The outer casing 40 includes an upper cover 41 fitted onto an upper side of the inner chamber 30, a lower cover 42 fitted onto a lower side of the inner chamber 30, and a locating plate 43. The locating plate 43 is provided at a central area with an opening 431 for the spark-plug mounting pipe 312 to fitly extend therethrough. The upper cover 41 is provided on an end opposite to the locating plate 43 with two internally threaded holes 411, and the lower cover 42 is provided on the same end at positions corresponding to the two threaded holes 411 with two pin holes 421. Two screws 44 can be sequentially extended through the two pin holes 421 on the lower cover 42 and then tightened into the two threaded holes 411 on the upper cover 41 to lock the upper cover 41 and the lower cover 42 together at the aforesaid end. The upper cover 41 and the lower cover 42 are provided on another end adjacent to the locating plate 43 with two internally threaded holes 412, 422, respectively. The locating plate 43 is provided with four pin holes 432, which are located corresponding to the threaded holes 412, 422. Four screws 45 can be sequentially extended through the four pin holes 432 on the locating plate 43 and then tightened into the threaded holes 412, 422 on the upper and the lower cover 41, 42, respectively, to thereby lock the locating plate 43 to the upper and lower covers 41, 42 to form the complete outer casing 40 with the inner chamber 30 being confined in between the upper cover 41, the lower cover 42 and the locating plate 43.

Figure 5:
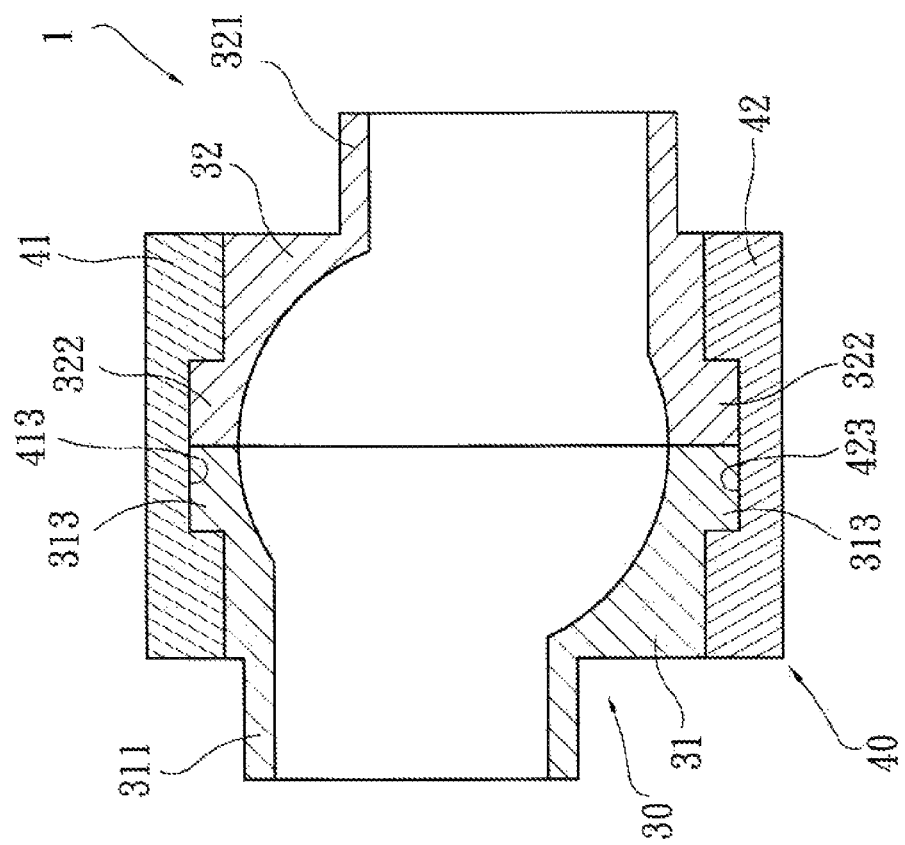
FIG. 5 is a longitudinal sectional view of FIG. 2.

The left-half chamber 31 has an outer-diameter-expanded first flange 313 formed on around the right end of the left-half chamber 31, and the right-half chamber 32 has an outer-diameter-expanded second flange 322 formed on around a left end of the right-half chamber 32. The first and the second flange 313, 322 are the same in their outer diameters. Please refer to FIG. 5. The upper cover 41 has an axially extended first recess 413 centered at an inner wall surface thereof, and the lower cover 42 has an axially extended second recess 423 centered at an inner wall surface thereof. An upper part of the first flange 313 of the left-half chamber 31 and an upper part of the second flange 322 of the right-half chamber 32 can be fitly received and juxtaposed in the first recess 413. Similarly, a lower part of the first flange 313 of the left-half chamber 31 and a lower part of the second flange 322 of the right-half chamber 32 can be fitly received and juxtaposed in the second recess 423. With these designs, the left-half chamber 31 and the right-half chamber 32 are confined in between the upper cover 41 and the lower cover 42 to tightly combine with each other, as shown in FIG. 5.

For an optimal spatial arrangement of the rotary engine, in a practical application of the present invention, the inner chamber 30 can be milled to partially remove an upper portion thereof to enable a reduced overall height of the outer casing 40 and accordingly, keep a proper distance between the combustion chamber 1 and the rotary shaft 50.

Figure 6:
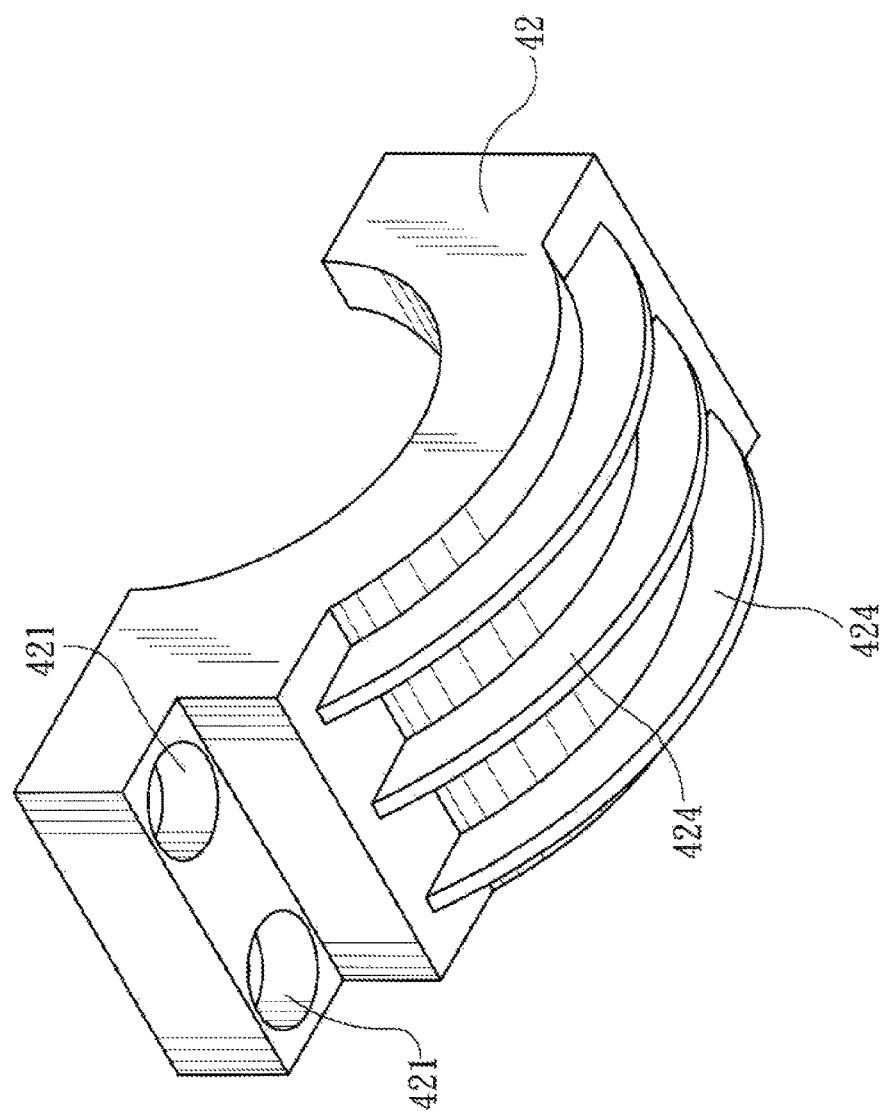
FIG. 6 is a bottom perspective view of a lower cover of an outer casing for the combustion chamber of FIG. 2.

Please refer to FIG. 6. The lower cover 42 of the outer casing 40 is provided on a bottom outer surface with a plurality of radiating fins 424 to advantageously enhance the heat dissipation effect of the combustion chamber 1.

In summary, the combustion chamber provided according to the present invention has simplified structure and is easy to install. What is most important is the combustion chamber according to the present invention is an independent device located outside the compression cylinder and the power cylinder, and this design has never been found in the conventional single-cylinder engine and makes the present invention novel and creative.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A combustion chamber for a rotary engine, comprising:
    an inner chamber including a left-half chamber and a right-half chamber, which are combined and tightly connected together to provide the complete inner chamber; the inner chamber having a spherical interior wall surface; the left-half chamber having an intake pipe arranged on a left end thereof and a spark-plug mounting pipe perpendicularly extended from a right end thereof; and the right-half chamber having an exhaust pipe arranged on a right end thereof; and
    an outer casing including an upper cover fitted onto an upper side of the inner chamber, a lower cover fitted onto a lower side of the inner chamber, and a locating plate provided at a central area with an opening for the spark-plug mounting pipe to fitly extend therethrough; the upper and the lower cover being locked to each other at one end by threading screws therethrough, and the locating plate being connected to another end of the upper and the lower cover by threading screws through the locating plate into the other end of the upper and the lower cover, so as to provide the complete outer casing with the inner chamber being confined in between the upper and the lower cover and the locating plate.

2. The combustion chamber for a rotary engine as claimed in claim 1, wherein the left-half chamber has an outer-diameter-expanded first flange formed on around the right end of the left-half chamber and the right-half chamber has an outer-diameter-expanded second flange formed on around a left end of the right-half chamber; and wherein the upper cover has an axially extended first recess centered at an inner wall surface thereof and the lower cover has an axially extended second recess centered at an inner wall surface thereof; an upper part of the first flange of the left-half chamber and an upper part of the second flange of the right-half chamber being fitly received and juxtaposed in the first recess; and a lower part of the first flange of the left-half chamber and a lower part of the second flange of the right-half chamber being fitly received and juxtaposed in the second recess.

3. The combustion chamber for a rotary engine as claimed in claim 1, wherein the locating plate is provided with four pin holes for four screws to extend therethrough and then thread into internally threaded holes that are pre-formed on the upper and the lower cover corresponding to the pin holes on the locating plate.

4. The combustion chamber for a rotary engine as claimed in claim 1, wherein the lower cover of the outer casing is provided on a bottom outer surface with a plurality of radiating fins.

\* \* \* \* \*